(12) United States Patent
Ono et al.

(10) Patent No.: US 9,688,563 B2
(45) Date of Patent: Jun. 27, 2017

(54) APPARATUS AND METHOD FOR FORMING HOLES IN GLASS SUBSTRATE

(71) Applicant: Asahi Glass Company, Limited, Chiyoda-ku (JP)

(72) Inventors: Motoshi Ono, Chiyoda-ku (JP); Takanori Kobashi, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/057,605

(22) Filed: Mar. 1, 2016

(65) Prior Publication Data

US 2017/0137314 A1    May 18, 2017

(30) Foreign Application Priority Data

Nov. 16, 2015 (JP) ................ 2015-224251

(51) Int. Cl.
*C03B 33/10* (2006.01)
*B26D 7/01* (2006.01)
*C03B 33/023* (2006.01)

(52) U.S. Cl.
CPC .......... *C03B 33/023* (2013.01); *C03B 33/102* (2013.01); *B26D 7/01* (2013.01)

(58) Field of Classification Search
CPC .......... B26D 7/015; B26D 7/016; B26D 7/20; B26D 7/10; C03B 33/091; C03B 33/023; C03B 33/102; B26F 1/28
See application file for complete search history.

(56) References Cited

U.S. PATENT DOCUMENTS

| | | | | |
|---|---|---|---|---|
| 4,030,390 A | * | 6/1977 | Heiting | B26D 7/015 83/123 |
| 4,205,835 A | * | 6/1980 | Gerber | A41H 15/00 269/21 |
| 4,656,791 A | * | 4/1987 | Herrington | B24C 1/045 269/21 |
| 5,022,956 A | * | 6/1991 | Cziep | H05K 3/0041 216/18 |
| 5,364,083 A | * | 11/1994 | Ross | B25B 11/005 269/21 |

(Continued)

FOREIGN PATENT DOCUMENTS

| | | | | |
|---|---|---|---|---|
| JP | 11-123577 A | | 5/1999 | |
| KR | 2005040236 A | * | 5/2005 | ............... G02F 1/13 |
| WO | WO 2011/038788 A1 | | 4/2011 | |

*Primary Examiner* — Jodi C Franklin
(74) *Attorney, Agent, or Firm* — Oblon, McClelland, Maier & Neustadt, L.L.P.

(57) ABSTRACT

An apparatus for forming holes in a glass substrate, includes a laser source that irradiates a laser beam on a first surface of the glass substrate, and a base plate on which a second surface of the glass substrate, opposite to the first surface, is placed. The base plate includes a recessed area in a central part thereof, and supports arranged within the recessed area to support the glass substrate. At least a part of the supports is arranged in a lattice shape within a plane approximately perpendicular to a direction in which the supports extend. One support and another adjacent support closest to the one support, amongst the supports arranged in the lattice shape, are arranged at an interval that is shorter than 30 mm, and the supports have a height that is higher than 70 μm.

17 Claims, 7 Drawing Sheets

(56) References Cited

U.S. PATENT DOCUMENTS

| | | | | |
|---|---|---|---|---|
| 5,492,582 | A * | 2/1996 | Ide | G02F 1/133351 156/101 |
| 5,639,289 | A * | 6/1997 | Fluckiger | B23B 41/003 65/112 |
| 7,207,250 | B2 * | 4/2007 | Lisec | B65G 49/064 225/103 |
| 7,866,642 | B2 * | 1/2011 | McAllister | B23Q 1/035 269/266 |
| 8,006,966 | B2 * | 8/2011 | Kwon | B65G 49/061 269/48.1 |
| 8,322,700 | B2 * | 12/2012 | Saberton | B23Q 1/035 269/296 |
| 8,361,233 | B2 * | 1/2013 | Kwon | B65G 49/065 118/500 |
| 8,766,135 | B2 * | 7/2014 | Roh | G01N 21/958 219/121.62 |
| 8,842,358 | B2 * | 9/2014 | Bareman | G02F 1/157 359/267 |
| 9,212,080 | B2 * | 12/2015 | Matsumoto | C03B 33/0222 |
| 9,427,885 | B2 * | 8/2016 | Schmidt | B26F 1/28 |
| 2007/0169849 | A1 * | 7/2007 | Yahagi | C03B 33/091 144/366 |
| 2007/0281444 | A1 * | 12/2007 | Nishio | B27B 5/063 438/462 |
| 2008/0047935 | A1 * | 2/2008 | Schmidt | B26F 1/28 219/69.1 |
| 2011/0303106 | A1 * | 12/2011 | Exley | B26F 1/04 101/26 |
| 2011/0304023 | A1 * | 12/2011 | Schmidt | B23K 26/0081 257/618 |
| 2012/0017642 | A1 * | 1/2012 | Teranishi | B28D 5/0011 65/105 |
| 2013/0122264 | A1 * | 5/2013 | Fujii | C03B 33/0222 428/192 |
| 2013/0174607 | A1 * | 7/2013 | Wootton | B24C 1/045 65/29.18 |
| 2013/0209731 | A1 * | 8/2013 | Nattermann | B23K 26/0093 428/131 |
| 2013/0247615 | A1 * | 9/2013 | Boek | C03C 15/00 65/29.1 |
| 2013/0291593 | A1 * | 11/2013 | Roh | G01N 21/958 65/29.12 |
| 2013/0330506 | A1 * | 12/2013 | Schmidt | B26F 1/28 428/131 |
| 2013/0340480 | A1 * | 12/2013 | Nattermann | B26F 1/28 65/112 |
| 2014/0326121 | A1 * | 11/2014 | Kim | B26D 7/015 83/467.1 |
| 2014/0363626 | A1 * | 12/2014 | Takahashi | B26F 1/28 428/136 |
| 2015/0284284 | A1 * | 10/2015 | Konishi | C03B 33/03 65/105 |

* cited by examiner

APPARATUS AND METHOD FOR FORMING HOLES IN GLASS SUBSTRATE

CROSS-REFERENCE TO RELATED APPLICATIONS

This application is based upon and claims the benefit of priority of Japanese Patent Application No. 2015-224251 filed on Nov. 16, 2015, the entire contents of which are incorporated herein by reference.

BACKGROUND OF THE INVENTION

1. Field of the Invention

The present invention relates to an apparatus and a method for forming holes in a glass substrate.

2. Description of the Related Art

A technique for forming holes in a glass substrate by irradiating a laser beam on the glass substrate is proposed in Japanese Laid-Open Patent Publication No. 11-123577, for example.

The holes formed by the conventional hole forming technique may often include holes having dimensions and shapes falling outside a tolerable range. For example, amongst the plurality of holes that are formed, some holes may have diameters outside a tolerable diameter range, and some holes may have opening shapes deviating from a complete round shape.

Accordingly, there are demands for a hole forming technique capable of accurately forming the holes to desired dimensions and shapes.

SUMMARY OF THE INVENTION

Accordingly, one object of the present invention is to provide an apparatus and a method for accurately forming holes having desired diameters and opening shapes.

According to one aspect of the present invention, an apparatus for forming holes in a glass substrate, includes a laser source that irradiates a laser beam on a first surface of the glass substrate; and a base plate on which a second surface of the glass substrate, opposite to the first surface, is placed, wherein the base plate includes a recessed area in a central part thereof, and a plurality of supports arranged within the recessed area to support the glass substrate, wherein at least a part of the plurality of supports is arranged in a lattice shape within a plane approximately perpendicular to a direction in which the plurality of supports extend, wherein one support and another adjacent support closest to the one support, amongst the supports arranged in the lattice shape, are arranged at an interval d that is shorter than 30 mm, and wherein the plurality of supports have a height h that is higher than 70 μm.

According to another aspect of the present invention, a method for forming holes in a glass substrate, includes preparing a workpiece that includes a glass substrate having a first surface and a second surface opposite to the first surface; and irradiating a laser beam on the first surface of the glass substrate, to form the holes in the glass substrate, wherein the irradiating is performed in a state in which the workpiece is placed on a base plate such that the second surface of the glass substrate is closer to the base plate, wherein the base plate includes a recessed area in a central part thereof, and a plurality of supports within the recessed area to support the workpiece, wherein at least a part of the plurality of supports is arranged in a lattice shape within a plane approximately perpendicular to a direction in which the plurality of supports extend, wherein one support and another adjacent support closest to the one support, amongst the supports arranged in the lattice shape, are arranged at an interval d that is shorter than 30 mm, and wherein the plurality of supports have a height h that is higher than 70 μm.

Other objects and further features of the present invention will be apparent from the following detailed description when read in conjunction with the accompanying drawings.

DESCRIPTION OF THE PREFERRED EMBODIMENTS

Figure 1:
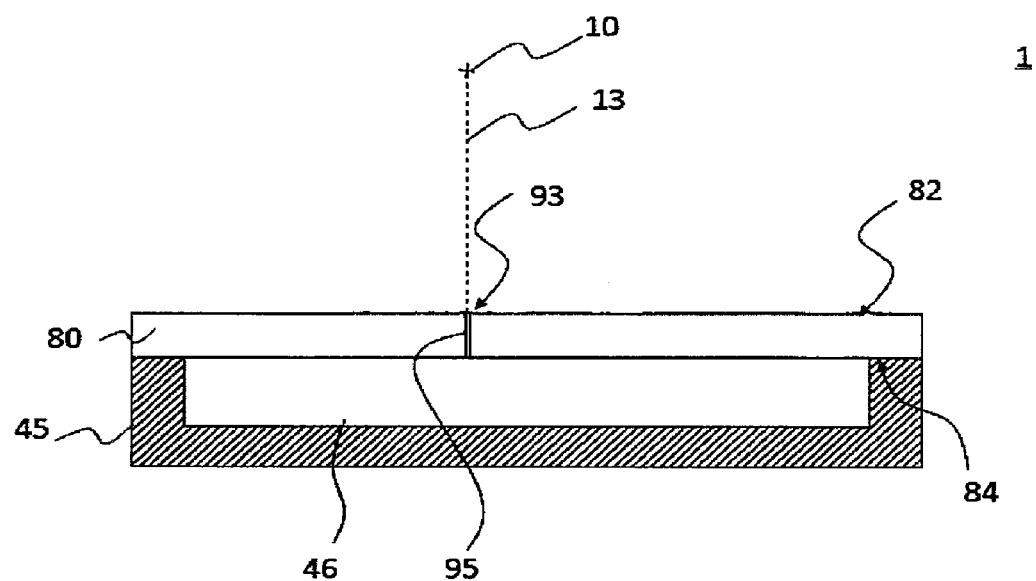
FIG. 1 is a diagram schematically illustrating a structure of an example of a hole forming apparatus.

A description will hereinafter be given of embodiments of the present invention with reference to the drawings. In the drawings used to describe the embodiments, parallel lines, perpendicular lines, curvatures of corner parts, or the like may tolerate an error to a certain extent that does not impair the effects of the embodiments. In the following description, coordinates are defined by arrows at a lower left of the drawings, and a reference is made to the coordinates where necessary.

In this specification, a "hole" includes both a hole that penetrates a member, and a hole that does not penetrate the member and has a predetermined depth. In other words, the "hole" includes both a through-hole (or penetrating hole) and a non-penetrating hole (or blind hole).

In addition, in this specification, "approximately perpendicular" to a plane or surface includes a range of 90°±2° with respect to the plane or surface.

(Example of Hole Forming Apparatus)

A description will be given of an example of a hole forming apparatus, by referring to FIG. 1, in order to facilitate understanding of embodiments of the present invention to be described later. FIG. 1 is a diagram schematically illustrating a structure of an example of a hole forming apparatus.

As illustrated in FIG. 1, a hole forming apparatus 1 includes a laser source 10, and a base plate 45. The laser source 10 includes a function to irradiate a laser beam 13 towards a glass substrate 80 which is an example of a target workpiece.

The laser source 10 irradiates the laser beam 13 onto a first surface 82 of the glass substrate 80. The laser beam 13 irradiates an irradiating region 93 on the first surface 82 of the glass substrate 80. Hence, a temperature locally rises at the irradiating region 93 of the glass substrate 80, and a first hole is formed immediately under the irradiating region 93.

Next, the base plate 45 is moved in a horizontal direction, and the glass substrate 80 is arranged at a predetermined location. Thereafter, a second hole is formed in the glass substrate 80, by a process similar to the process of forming the first hole.

A plurality of holes can be formed in the glass substrate 80 by repeating the processes described above.

A plurality of holes 95 (only one illustrated in FIG. 1) that are formed by the hole forming apparatus 1 described above may often include holes 95 having dimensions and shapes falling outside a tolerable range. For example, some holes 95 may have diameters outside a tolerable diameter range, and some holes 95 may have opening shapes deviating from a complete round shape.

The present inventors have conducted experiments and tests to develop an apparatus and a method to minimize the above described problem of the hole forming apparatus 1. As a result, the present inventors found that, in some cases, a relative focal point position of the laser beam 13 with respect to the glass substrate 80, irradiated on the first surface 82 of the glass substrate 80, at one region deviates in a Z-axis direction (that is, in a direction along a thickness of the glass substrate 80) compared to the focal point at another region. The present inventors also found that this deviation of the focal point of the laser beam 13 irradiated on the first surface 82 of the glass substrate 80 causes the diameter of the hole 95 to fall outside the tolerable diameter range. The deviation of the focal point of the laser beam 13 irradiated on the first surface 82 of the glass substrate 80 may be caused by warping of the glass substrate 80 due to a weight of the glass substrate 80 that is arranged on the base plate 45, deformation of the glass substrate 80 due to thermal stress during a process, machining, or the like.

The present inventors also found that a depth of a recessed area 46 of the base plate 45 affects a shape (or circularity) of a second opening (that is, an opening on a side of a second surface 84 of the glass substrate 80) of the hole 95. More particularly, the present inventors found that the circularity of the second opening of the hole 95 tends to deteriorate in a case in which the depth of the recessed area 46 of the base plate 45 is relatively shallow. It may be regarded that heat accumulated within the recessed area 46 causes thermofusion of the second opening of the hole 95, to deteriorate the circularity of the second opening of the hole 95.

Based on the findings described above, the present inventors conceived the following countermeasures (i) and (ii) against the above described problem of the hole forming apparatus 1:

(i) The focal point of the laser beam 13 is maintained constant as much as possible regardless of the location within a machining region (or machinable region) on the first surface 82 of the glass substrate 80, in order to improve the accuracy of the hole diameter; and (ii) The depth of the recessed area 46 of the base plate 45 is set to a predetermined range or greater, in order to avoid thermofusion of the second opening of the hole 95.

In other words, according to one aspect of the present invention, an apparatus for forming holes in a glass substrate, includes a laser source that irradiates a laser beam on a first surface of the glass substrate, and a base plate on which a second surface of the glass substrate, opposite to the first surface, is placed, wherein the base plate includes a recessed area in a central part thereof, and a plurality of supports arranged within the recessed area to support the glass substrate, wherein at least a part of the plurality of supports is arranged in a lattice shape within a plane approximately perpendicular to a direction in which the plurality of supports extend, wherein one support and another adjacent support closest to the one support, amongst the supports arranged in the lattice shape, are arranged at an interval d that is shorter than 30 mm, and wherein the plurality of supports have a height h that is higher than 70 µm.

In addition, in the apparatus according to another aspect of the present invention, at least a part of the plurality of supports are arranged in a triangular lattice shape within the plane approximately perpendicular to the direction in which the plurality of supports extend.

Furthermore, in the apparatus according to still another aspect of the present invention, at least a part of the plurality of supports are arranged in a rectangular lattice shape within the plane approximately perpendicular to the direction in which the plurality of supports extend.

According to the aspects of the present invention, a plurality of supports (or support columns or pillars) are provided within the recessed area of the base plate. At least a part of the plurality of supports is arranged in a lattice shape. The supports that are arranged in the lattice shape include one support and another adjacent support closest to the one support and arranged at the support interval d from the one support, where d is preferably shorter than 30 mm.

In this specification, the "lattice shape" of the supports refers to a shape in which the supports are arranged at intersections of a group of parallel lines extending in two or more directions. The group of parallel lines are arranged at certain spacings, and the parallel lines are preferably equally spaced. A triangular lattice refers to a case in which a pattern formed by the group of parallel lines that intersect at the certain spacings is a triangle, and a rectangular lattice refers to a case in which the pattern formed by the group of parallel lines that intersect at the certain spacings is a rectangle. The triangular lattice preferably has an equilateral triangular shape, and the rectangular lattice preferably has a square shape.

By regularly arranging the supports within the recessed area of the base plate at the interval d described above, it becomes possible to significantly suppress deformation of the glass substrate that is arranged on an upper part of the base plate. As a result, the focal point of the laser beam can be made substantially constant regardless of the location on the first surface of the glass substrate, and the accuracy of the hole diameter can be improved.

According to the aspects of the present invention, the height h of the supports within the recessed area of the base plate is higher than 70 µm. By adjusting the supports of the base plate to this height h, it becomes possible to significantly avoid the thermofusion of the second opening of the holes caused by the heat accumulated within the recessed area of the base plate during the process or machining. In addition, the opening shape of the holes can be made closer to the desired shape (for example, complete round shape).

Therefore, according to the above described features of the aspects of the present invention, it is possible to form the holes having the desired diameter and the desired opening shape with a high accuracy.

(Hole Forming Apparatus in One Embodiment)

Figure 2:
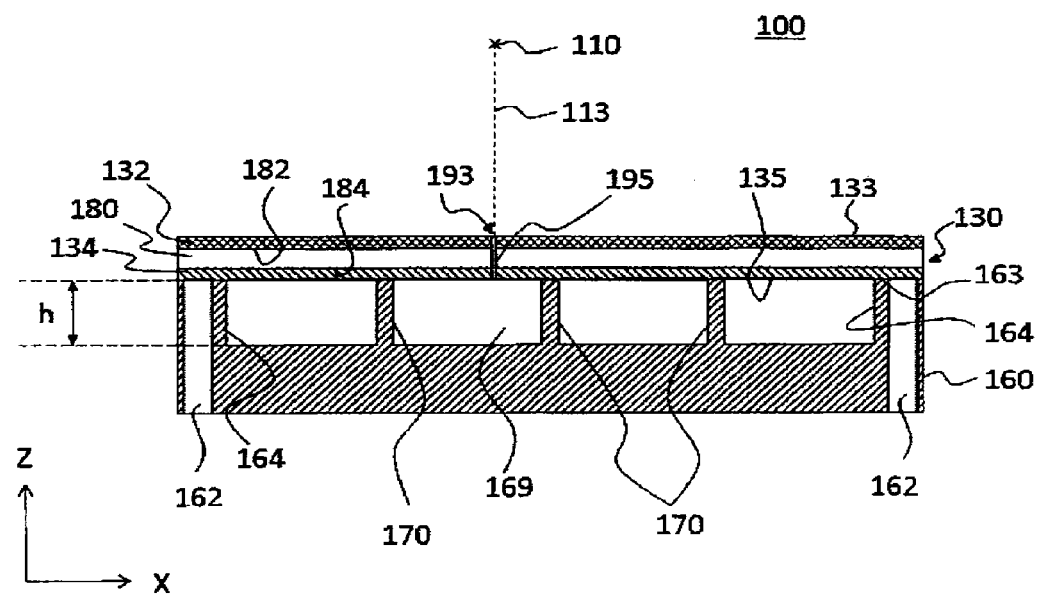
FIG. 2 is a diagram schematically illustrating a structure of an example of a hole forming apparatus in one embodiment of the present invention.
Figure 3:
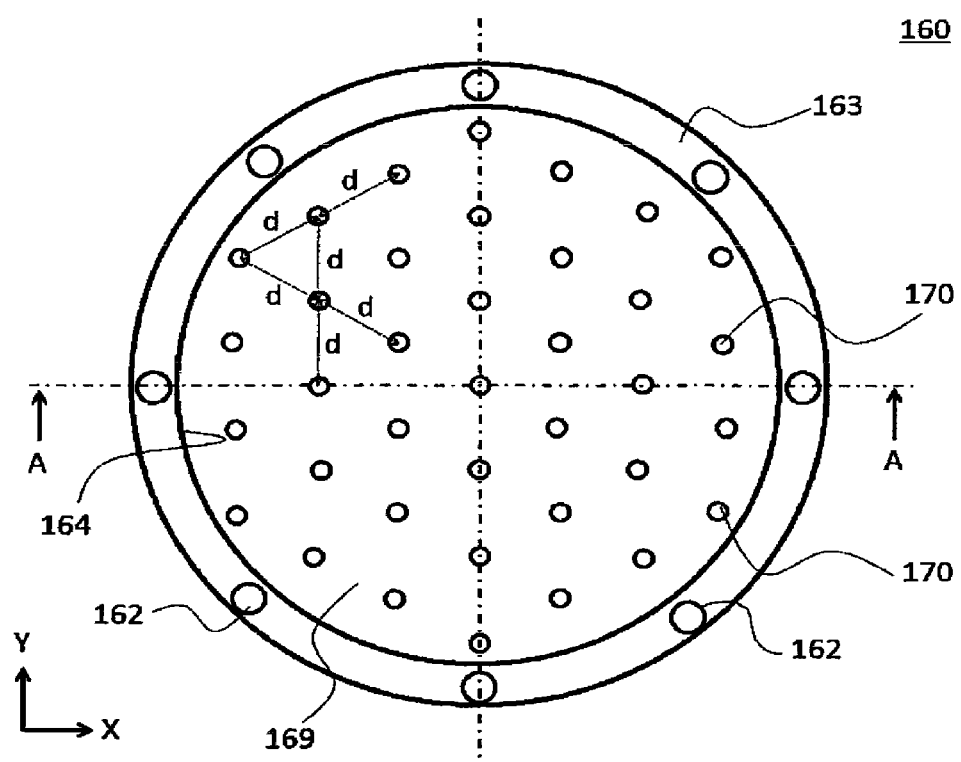
FIG. 3 is a top view schematically illustrating an example of a base plate that is used in the hole forming apparatus illustrated in FIG. 2.

Next, a description will be given of a hole forming apparatus in one embodiment of the present invention, by referring to FIGS. 2 and 3. FIG. 2 is a diagram schematically illustrating a structure of an example of the hole forming apparatus in one embodiment of the present invention. Further, FIG. 3 is a top view schematically illustrating an example of the base plate that is used in the hole forming apparatus illustrated in FIG. 2.

As illustrated in FIG. 2, a first hole forming apparatus 100 is capable of forming holes 195 in a workpiece 130.

The workpiece 130 includes a glass substrate 180 having a first surface 182 and a second surface 184 opposite to the first surface 182. In addition, the workpiece 130 further includes a first protection film 132 provided on a side of the first surface 182 of the glass substrate 180, and a second protection film 134 provided on a side of the second surface 184 of the glass substrate 180. Accordingly, a first surface 133 of the workpiece 130 is formed by an outer surface of the first protection film 132, and a second surface 135 of the workpiece 130 is formed by an outer surface of the second protection film 134.

The first protection film 132 and the second protection film 134 have a function to prevent debris from adhering to the surface (the first surface 182 and/or the second surface 184) of the glass substrate 180 during a process or machining. However, each of the first protection film 132 and the second protection film 134 is not essential parts of this embodiment, and at least one of the first protection film 132 and the second protection film 134 may be omitted.

The glass substrate 180 has a thickness in a range of 0.05 mm to 0.7 mm, for example.

As illustrated in FIG. 2, the first hole forming apparatus 100 includes a laser source 110 and a base plate 160.

The laser source 110 has a function to irradiate a laser beam 113 towards the first surface 133 of the workpiece 130. For example, the laser source 110 may be a $CO_2$ laser, an UV (Ultra-Violet) laser, or the like.

The base plate 160 has a function to support and fix the workpiece 130 thereon. The base plate 160 includes a recessed area 169 formed at a central part thereof. For example, the base plate 160 may be formed by a conductive material, an insulator material such as a resin, or the like. The conductive material may be a metal, such as aluminum, or an alloy, such as aluminum alloy.

As illustrated in FIG. 3, the base plate 160 has an approximate circular shape. An outer diameter of the approximate circular shape is the same as an outer diameter of the workpiece 130, or is smaller than the outer diameter of the workpiece 130.

In addition, the base plate 160 includes an inner wall 164 that defines the recessed area 169, and a plurality of supports (or support columns or pillars) 170 provided within the recessed area 169. As illustrated in FIG. 2, the inner wall 164 is formed at an outer peripheral part of the base plate 160, and a diameter of the inner wall 164 of the base plate 160 is set smaller than the outer diameter of the workpiece 130. Accordingly, the workpiece 130 can be placed (or set) on an upper surface 163 of the base plate 160.

Furthermore, the base plate 160 includes one or more suction holes 162, and each suction hole 162 is connected to an external suction apparatus (not illustrated). The base plate 160 can fix the workpiece 130 that is placed on the upper surface 163 of the base plate 160 under suction by a negative pressure generated by the external suction apparatus via the one or more suction holes 162. In other words, the base plate 160 includes a suction mechanism that fixes the workpiece 130 thereon by suction.

The plurality of supports 170 are regularly arranged within the recessed area 169 of the base plate 160. More particularly, at least a part of the plurality of supports 170 is arranged in the triangular lattice shape within the recessed area 169. Preferably, all of the plurality of supports 170 are arranged in the triangular lattice shape within the recessed area 169. When the supports 170 are arranged in the triangular lattice shape, these supports 170 are arranged at vertexes of the equilateral triangular shape forming the triangular lattice shape.

As illustrated in FIG. 3, amongst the supports 170 that are arranged in the triangular lattice shape, one support 170 and another adjacent support 170 closest to the one support 170 are arranged at a support interval d. The support interval d is a distance between centers of the one support 170 and the other adjacent support 170 closest to the one support 170, that is, the distance between the centers of two mutually adjacent supports 170. The distance d is set to satisfy the following relationship (1).

$$d<30 \text{ mm} \quad (1)$$

In addition, each support 170 and the internal wall 164 have a height h, and this height h is set to satisfy the following relationship (2).

$$70 \text{ μm}<h \quad (2)$$

The height h of each support 170 matches the depth of the recessed area 169, as illustrated in FIG. 2. In addition, the height h of each support 170 matches a distance between the upper surface 163 of the base plate 160 and a bottom surface of the recessed area 169.

As an example, FIGS. 2 and 3 illustrate each support 170 as having a cylinder shape. However, each support 170 is not limited to the cylinder shape, and may have other shapes, such as a triangular prism shape, a rectangular prism shape, or the like. The plurality of supports 170 may have the same shape or may have different shapes.

Each support 170 may be formed by the same material as the base plate 160, or may be made of a material different from the material forming the base plate 160. Each support 170 may be integrally formed on the base plate 160, or may be formed separately from the base plate 160. In addition, a top part of each support 170 may be coated with an insulator material, such as a resin. For example, the top part of each support 170 that is formed by the conductive material may be coated with the insulator material. By coating the top part of each support 170, it is possible to prevent damage to a surface of the workpiece 130 making contact with the support 170.

In a case in which the holes are formed in the glass substrate 180 using the first hole forming apparatus 100 having the base plate 160 described above, the workpiece 130 is placed on the base plate 160. Then, the external suction apparatus is started. As a result, the workpiece 130 is fixed on the upper surface 163 of the base plate 160 under suction by the negative pressure generated by the external suction apparatus via the one or more suction holes 162.

Next, the laser beam 113 is irradiated from the laser source 110 towards the first surface 133 of the workpiece 130. The laser beam 113 irradiates an irradiating region 193 on the first surface 133 of the workpiece 130.

Accordingly, a temperature locally rises at the irradiating region 193 of the workpiece 130, and a part of each of the first protection film 132, the glass substrate 180, and the second protection film 134, immediately under the irradiating region 193, is removed, to form the hole 195 in the glass substrate 180. The hole 195 is formed from the surface of the workpiece 130 irradiated with the laser beam 113 towards surface of the workpiece 130 closer to the base plate 160. In other words, the hole 195 is formed from the first surface 133 towards the second surface 135. The hole 195 that reaches the second surface 135 forms a through-hole, and the hole 195 that does not reach the second surface 135 and stops at a predetermined depth forms a non-penetrating hole. In a case in which the first protection film 132 and the second protection film 134 are not provided, the hole 195 is formed on the first surface 182 towards the second surface 184 of the glass substrate 180. In this case, the hole 195 that reaches the second surface 184 forms a through-hole, and the hole 195 that does not reach the second surface 184 and stops at a predetermined depth forms a non-penetrating hole.

As described above, the hole 95 formed by the hole forming apparatus 1 illustrated in FIG. 1 may have a diameter falling outside the tolerable diameter range, and may have an opening deviating from the complete round shape.

On the other hand, in the first hole forming apparatus 100 illustrated in FIG. 2, the supports 170 are regularly arranged in the triangular lattice shape, and the interval d of the supports 170 is set to satisfy the relationship (1) described above, that is, to shorter than 30 mm. For example, the interval d of the supports 170 is set in a range of 15 mm to 25 mm, and more preferably in a range of 20 mm to 25 mm. By setting the interval d to such a range, it is possible to form the holes 195 having a diameter that is approximately in a range of a target value plus (+) 5%.

In this case, a deformation of the workpiece 130 that is arranged on the upper surface 163 of the base plate 160, in a direction along the thickness of the workpiece 130, can be significantly suppressed. In addition, it is possible to significantly suppress the relative focal point position of the laser beam 113 with respect to the workpiece 130, irradiated on the first surface 133 of the workpiece 130, from deviating along the Z-axis direction (that is, in the direction along the thickness of the workpiece 130). As a result, it is possible to improve the accuracy of the diameter of the holes 195 that are formed.

Moreover, in the first hole forming apparatus 100, the height h of the supports 170 of the base plate 160 is set to satisfy the relationship (2) described above, that is, to higher than 70 For example, the height h of the supports 170 is set higher than 70 μm, preferably 100 μm or higher, and more preferably 200 μm or higher.

In this case, it is possible to significantly suppress the thermofusion of the second opening of the holes 195 (that is, the opening on the side of the second surface 184 of the glass substrate 180) caused by heat accumulated within the recessed area 169.

As a result, the first hole forming apparatus 100 can accurately form the holes 195 to the desired diameter and opening shape.

From a viewpoint of suppressing the thermofusion, the height h of the supports 170 is ideally infinitely high. However, when handling ease is taken into consideration, the height h of the supports 170 is preferably approximately 5 mm or lower.

In general, it is difficult to form the holes at the positions where the supports exist, while maintaining the hole quality. For this reason, when the intervals at which the supports are arranged become extremely short, there is a problem in that a machinable region on the glass substrate becomes considerably limited.

In order to cope with this problem, the interval d of the supports 170 in the first hole forming apparatus 100 is preferably longer than 10 mm, and more preferably 15 mm or longer. In this case, it is possible to significantly avoid the problem of increasing unused regions on the glass substrate 180 as the machinable region on the glass substrate 180 decreases. From a viewpoint of avoiding the warp or deformation of the workpiece 130, the interval d of the supports 170 is furthermore preferably 20 mm or longer.

From a viewpoint of providing a sufficiently large machinable region on the glass substrate 180, a size of each support 170 (that is, a maximum dimension of a cross section along a direction perpendicular to the direction in which the support 170 extends) is as small as possible. For example, the size of each support 170 may be in a range of 500 μm to 5000 μm.

Figure 4:
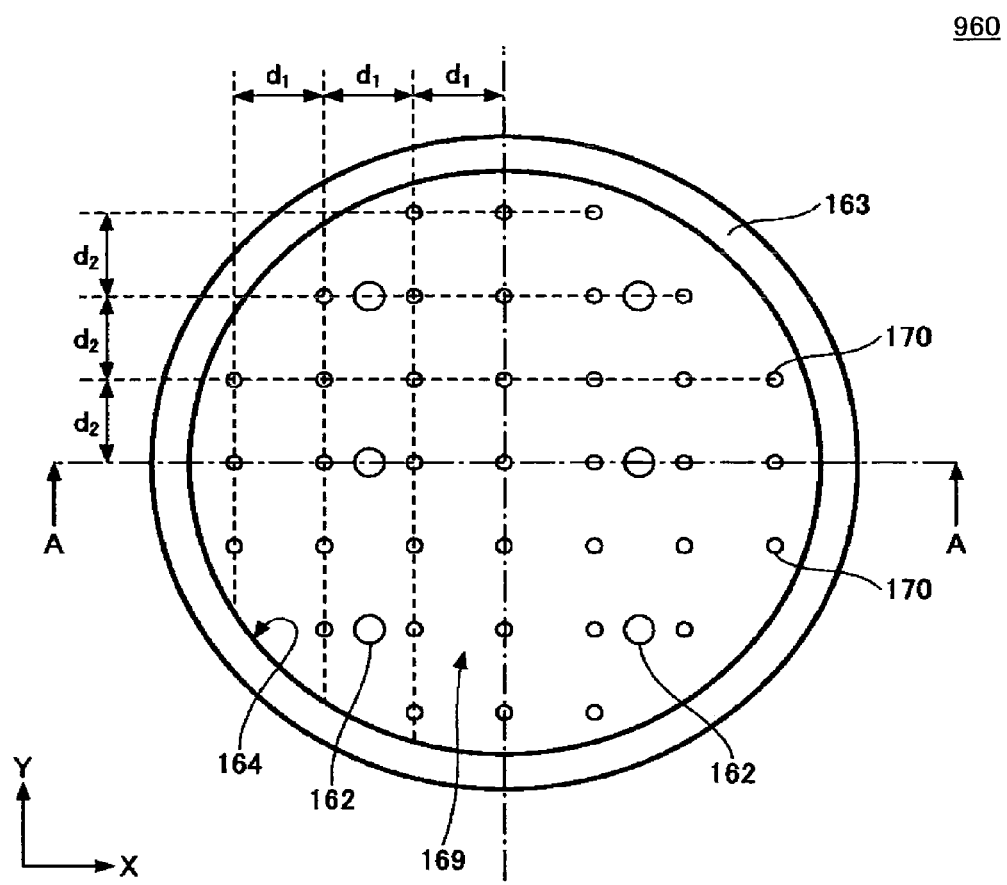
FIG. 4 is a top view schematically illustrating another example of the base plate that is used in the hole forming apparatus illustrated in FIG. 2.

FIG. 4 is a top view schematically illustrating another example of the base plate that is used in the hole forming apparatus illustrated in FIG. 2. In FIG. 4, those parts that are the same as those corresponding parts in FIG. 3 are designated by the same reference numerals, and a description thereof will be omitted. In this example, a base plate 960 illustrated in FIG. 4 is used in place of the base plate 160 illustrated in FIG. 3.

As illustrated in FIG. 4, the plurality of supports 170 are regularly arranged within the recessed area 169 of the base plate 160. More particularly, at least a part of the plurality of supports 170 is arranged along an X-axis direction and a Y-axis direction in the rectangular lattice shape within the recessed area 169. Preferably, all of the plurality of supports 170 are arranged along the X-axis direction and the Y-axis direction in the rectangular lattice shape within the recessed area 169. When the supports 170 are arranged in the rectangular lattice shape, these supports 170 are arranged at vertexes of the rectangular shape forming the rectangular lattice shape.

As illustrated in FIG. 4, the supports 170 are arranged in the X-axis direction at an interval $d_1$, and the supports 170 are arranged in the Y-axis direction at an interval $d_2$. The interval $d_1$ may be the same as the interval $d_2$, or the interval $d_1$ and the interval $d_2$ may be mutually different. When generally referring to the intervals $d_1$ and $d_2$, each of these intervals $d_1$ and $d_2$ may hereinafter be referred to as the "support interval d". The support interval d is a distance between centers of the one support 170 and the other adjacent support 170 closest to the one support 170, that is, the distance between the centers of two mutually adjacent supports 170.

The base plate 960 is similar to the base plate 160, except that the supports 170 of the base plate 960 are arranged in the rectangular lattice shape.

(Another Hole Forming Apparatus in One Embodiment)

Figure 5:
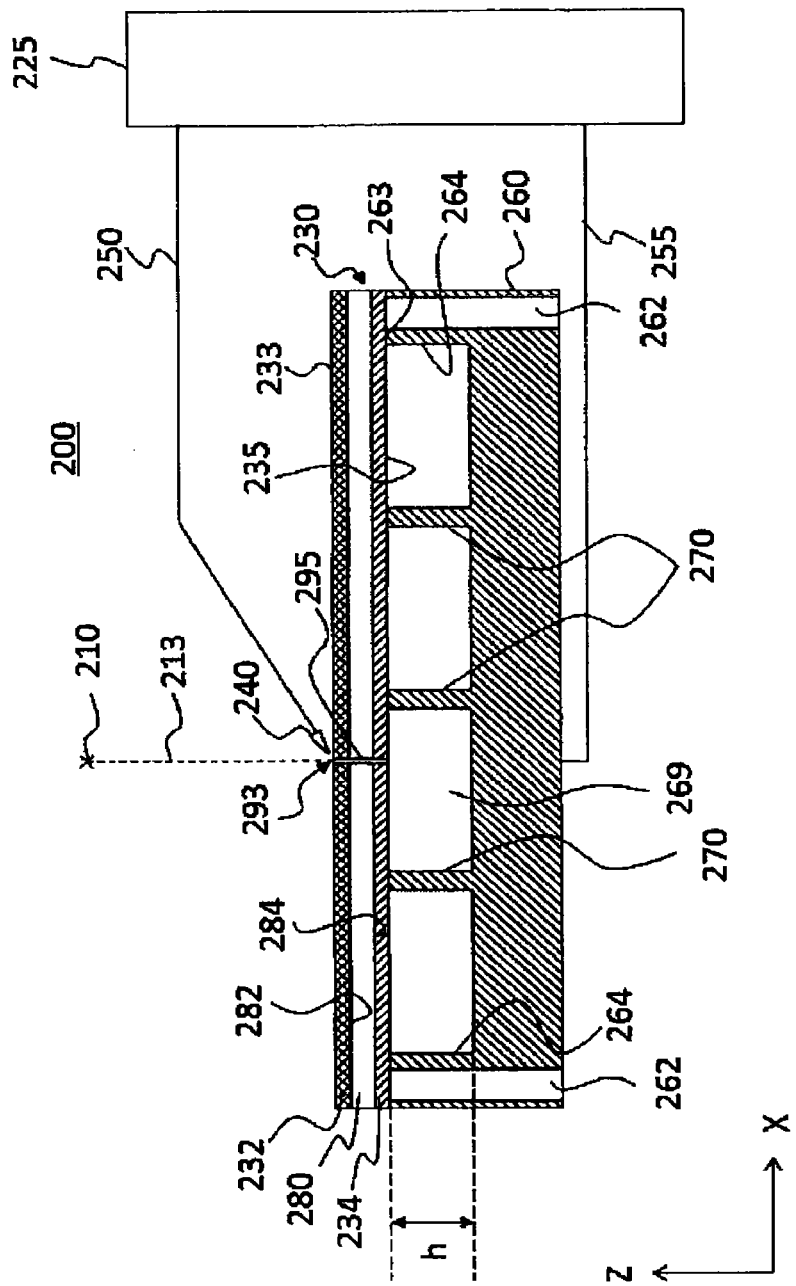
FIG. 5 is a diagram schematically illustrating the structure of another example of the hole forming apparatus in one embodiment of the present invention.

Next, a description will be given of another example of the hole forming apparatus in one embodiment of the present invention, by referring to FIG. 5. FIG. 5 is a diagram schematically illustrating the structure of the other example of the hole forming apparatus in one embodiment of the present invention. A second hole forming apparatus 200 illustrated in FIG. 5 forms the holes in the glass substrate, using a "discharge assisted laser drilling technique".

The "discharge assisted laser drilling technique" generally refers to a technique to form the hole in the irradiating region on the glass substrate by irradiating the laser beam with respect to the glass substrate, and thereafter adjust the shape of the hole using a discharge phenomenon between electrodes. Adjusting the shape of the hole refers to reducing necking that occurs when the hole is formed in the glass substrate by laser beam irradiation. The "necking" refers to a constricted part that may be formed within the hole after the laser beam machining.

As illustrated in FIG. 5, the second hole forming apparatus 200 includes a laser source 210, a DC (Direct Current) high voltage power supply 225, a first electrode 240, and a second electrode 260.

The laser source 210 irradiates a laser beam 213 towards a workpiece 230.

The first electrode 240 is electrically connected to a conductor 250, and the second electrode 260 is electrically connected to a conductor 255. These conductors 250 and 255 are connected to the DC high voltage power supply 225.

The first electrode 240 has a needle shape. On the other hand, the second electrode 260 is formed by a base plate similar to the base plate 160 described above in conjunction with FIGS. 2 and 3. Accordingly, the second electrode 260 may also be referred to as a "base plate 260" in the following description.

Because the base plate 260 as a configuration similar to that of the base plate 160 described above, those parts of the base plate 260 that are the same as those corresponding parts of the base plate 160 illustrated in FIGS. 2 and 3 are designated by the same reference numerals that are increased by "100". For example, the base plate 260 includes a plurality of supports 270 that are regularly arranged within a recessed area 269. In addition, the base plate 260 includes suction holes 262 for fixing the workpiece 230 on a top surface 263 under suction.

The workpiece 230 includes a glass substrate 280 having a first surface 282 and a second surface 284 opposite from the first surface 282. In addition, the workpiece 230 further includes a first protection film 232 provided on a side of the first surface 282 of the glass substrate 280, and a second protection film 234 provided on a side of the second surface 284 of the glass substrate 280. Accordingly, a first surface 233 of the workpiece 230 is formed by an outer surface of the first protection film 232, and a second surface 235 of the workpiece 230 is formed by an outer surface of the second protection film 234. The first surface 233 of the workpiece 230 may hereinafter also be referred to as an "irradiating surface".

Each of the first protection film 232 and the second protection film 234 is not essential parts of this embodiment, and at least one of the first protection film 232 and the second protection film 234 may be omitted.

When forming a plurality of holes 295 in the glass substrate 280 of the workpiece 230 using the second hole forming apparatus 200 described above, the workpiece 230 is first placed on the base plate 260. Then, an external suction apparatus (not illustrated) is started. Hence, the base plate 260 can fix the workpiece 230 that is placed on the upper surface 263 of the base plate 260 under suction by a negative pressure generated by the external suction apparatus via the suction holes 262. In other words, the base plate 260 includes a suction mechanism that fixes the workpiece 230 thereon by suction.

Next, the laser beam 213 is irradiated from the laser source 210 towards the first surface 233 of the workpiece 230. The laser beam 213 irradiates an irradiating region 293 on the first surface 233 of the workpiece 230.

Accordingly, a temperature locally rises at the irradiating region 293 of the workpiece 230, and a part of each of the first protection film 232, the glass substrate 280, and the second protection film 234, immediately under the irradiating region 293, is removed, to form the hole 295 in the glass substrate 280.

After irradiating the laser beam 213, the DC high voltage power supply 225 is used to apply a high DC voltage across the first electrode 240 and the second electrode (or base plate) 260. Hence, a discharge occurs between the first electrode 240 and the base plate 260. The discharge has a tendency to be generated through the hole 295, because a resistance at the hole position is lower than the resistance at other parts.

By the generation of the discharge, the shape of the hole 295 in the glass substrate 280 is adjusted.

Thereafter, a similar operation may be carried out to form a plurality of adjusted holes 295 in the glass substrate 280.

In the second hole forming apparatus 200, the interval d of the supports of the base plate 260 is also set to satisfy the relationship (1) described above. For example, the interval d of the supports 270 may be in a range of 15 mm to 25 mm.

Accordingly, in the second hole forming apparatus 200, a deformation of the workpiece 230 that is arranged on the upper surface 263 of the base plate 260, in a direction along the thickness of the workpiece 230, can also be significantly suppressed. In addition, it is possible to significantly suppress the relative focal point position of the laser beam 213 with respect to the workpiece 230, irradiated on the first surface 233 of the workpiece 230, from deviating along the Z-axis direction (that is, in the direction along the thickness of the workpiece 230). As a result, it is possible to improve the accuracy of the diameter of the holes 295 that are formed.

Moreover, in the second hole forming apparatus 200, the height h of the supports 270 of the base plate 260 is also set to satisfy the relationship (2) described above. For example, the height h of the supports 270 is set to 100 µm or higher. In addition, in order to generate the discharge between the first electrode 240 and the base plate 260, the height h of the supports 270 is preferably 1400 µm or lower.

In this case, it is possible to significantly suppress the thermofusion of the second opening of the holes 295 (that is, the opening on the side of the second surface 284 of the glass substrate 280) caused by heat accumulated within the recessed area 269.

As a result, the second hole forming apparatus 200 can accurately form the holes 295 to the desired diameter and opening shape.

In the second hole forming apparatus 200, the interval d of the supports 270 is also preferably set longer than 10 mm, more preferably 15 mm or longer, and furthermore preferably 20 mm or longer. In this case, it is possible to significantly avoid the problem of increasing unused regions on the glass substrate 280 as the machinable region on the glass substrate 280 decreases, and to significantly avoid the warp or deformation of the workpiece 230.

In the second hole forming apparatus 200, when a distance from a tip end of the first electrode 240 to a center of the focal point of the laser beam 213 on the first surface 233 of the workpiece 230 is denoted by a, a thickness of the workpiece 230 is denoted by T, and a height of the support 270 is denoted by h, a distance D represented by D=a+T+h is preferably set to satisfy the following relationship (3), where "<=" indicates "less than or equal to".

$$D(=a+T+h)<=3000 \text{ µm} \qquad (3)$$

In a case in which the distance D does not satisfy the relationship (3) described above, the discharge generated between the first electrode 240 and the base plate 260 may become unstable. However, by setting the distance D to less than or equal to 3000 µm, it is possible to generate stable discharge between the two electrodes 240 and 260, and to form the hole 295 by appropriately suppressing the necking.

Some features of one embodiment of the present invention are described above for the first hole forming apparatus 100 and the second hole forming apparatus 200. However, the features of one embodiment of the present invention are not limited to those described above for the first hole forming apparatus 100 and the second hole forming apparatus 200. For example, in each of the hole forming apparatus 100 and the hole forming apparatus 200, it is apparent to those skilled in the art that various variations, modifications, and substitutions may be made without departing from the scope of the present invention.

For example, in the first hole forming apparatus 100 and the second hole forming apparatus 200, the suction holes 162 and 262 of the base plates 160 and 260 are provided in the upper surfaces 163 and 263 of the base plates 160 and 260. However, it is of course possible to provide the suction holes 162 and 262 inside the supports 170 and 270, in addition to or in place of the suction holes 162 and 262 provided in the upper surfaces 163 and 263 of the base plates 160 and 260.

In addition, the shape of the base plates 160 and 260 is not limited to the circular shape, and may have various shapes according to the shape of the glass substrates 180 and 280. For example, the base plates 160 and 260 may have a square shape, a rectangular shape, an oval shape, or the like, and other various modifications may also be made.

(Method for Forming Holes in Glass Substrate in One Embodiment of Present Invention)

Figure 6:
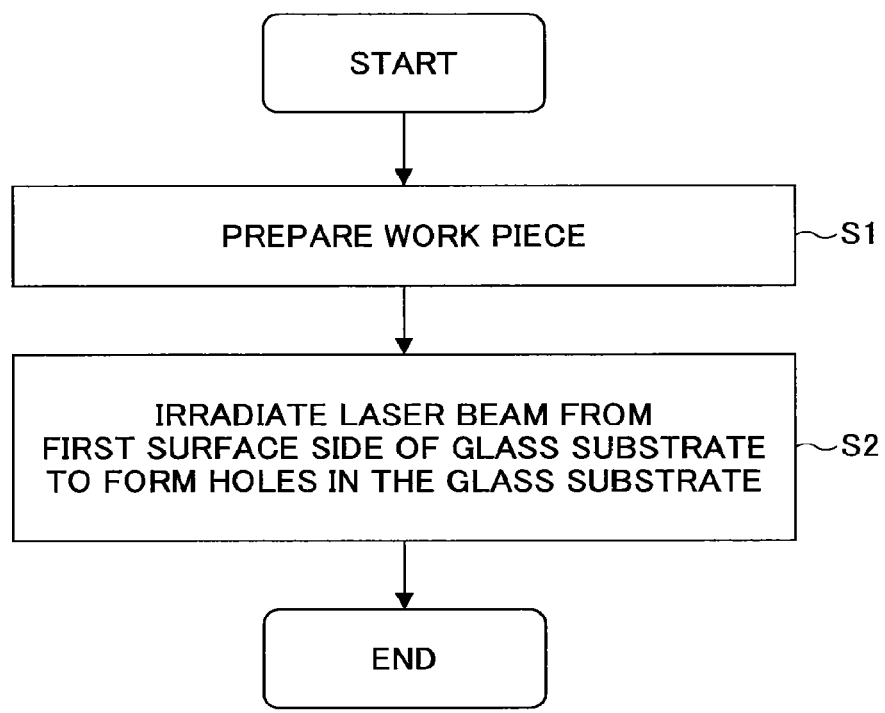
FIG. 6 is a flow chart schematically illustrating a method for forming holes in a glass substrate in one embodiment of the present invention.

Next, a description will be given of a method for forming holes in the glass substrate in one embodiment of the present invention, by referring to FIG. 6. FIG. 6 is a flow chart schematically illustrating the method for forming holes (hereinafter also referred to as "first hole forming method) in the glass substrate in one embodiment of the present invention.

As illustrated in FIG. 6, the first hole forming method includes steps S1 and S2. Step S1 prepares a workpiece. More particularly, the workpiece that is prepared includes a glass substrate which has a first surface and a second surface opposite to the first surface. A first protection film may be optionally provided on the first surface of the glass substrate, and/or a second protection film may be optionally provided on the second surface of the glass substrate. Step S2 irradiates a laser beam on the first surface of the glass substrate, to form a hole in the glass substrate.

Step S2 is carried out in a state in which the workpiece is placed (or set) on a base plate. More particularly, the workpiece is placed on the base plate such that the second surface of the glass substrate is closer to the base plate.

When using the "discharge assisted laser drilling technique" as in the case of the second hole forming apparatus 200, an additional step is carried out to generate a discharge at the glass substrate via the hole, after carrying out step S2. In this case, the additional step is carried out in the state in which the workpiece is placed (or set) on the base plate, similarly to the state in which step S2 is carried out.

In addition, the base plate includes a recessed area in a central part thereof, and a plurality of supports within the recessed area to support the workpiece. At least a part of the plurality of supports is arranged in a triangular lattice shape within a plane approximately perpendicular to a direction in which the plurality of supports extend. One support and another adjacent support closest to the one support, amongst the supports arranged in the triangular lattice shape, are arranged at an interval d that is longer than 10 mm and shorter than 30 mm. The plurality of supports have a height h that is higher than 70 µm.

According to the first hole forming method, it is possible to significantly suppress the deformation of the workpiece in the direction along the thickness of the workpiece. Consequently, it is possible to improve the accuracy of the diameter of the holes that are formed.

It is possible to significantly avoid thermofusion of a second opening of the holes (that is, an opening on a side of the second surface of the glass substrate) caused by heat accumulated within the recessed area of the base plate during the process or machining. As a result, the first hole forming method can form the holes to the desired diameter and opening shape with a high accuracy.

The discharge in the additional step described above may be generated between a needle-shaped first electrode arranged on the side of the first surface of the glass substrate and the base plate. In this case, the base plate is formed by a conductive material.

In a case in which a distance from a tip end of the first electrode to a center of the focal point of the laser beam on the first surface of the workpiece is denoted by a, a thickness of the workpiece is denoted by T, and a height of the support is denoted by h, a distance D represented by $D=a+T+h$ is preferably set less than or equal to 3000 µm. In this case, it is possible to generate stable discharge between the first electrode and the base plate.

First Exemplary Implementation

Next, a description will be given of exemplary implementations of the present invention.

(Experiment 1-1)

In a first exemplary implementation, the second hole forming apparatus 200 illustrated in FIG. 5 described above is used to form a plurality of holes in a glass substrate, and a state of the holes are evaluated.

Non-alkaline glass having dimensions of 50 mm in vertical length, 50 mm in horizontal length, and 0.3 mm in thickness is used as the glass substrate. A first protection film made of PET (Poly-Ethylene Terephthalate) and having a thickness of 75 µm is formed on a first surface of the glass substrate, and a second protection film made of PET and having a thickness of 75 µm is formed on a second surface of the glass substrate, opposite to the first surface, to form a workpiece.

An aluminum suction type base plate having a square shape (that is, dimensions of approximately 50 mm by approximately 50 mm) is used for a base plate, and all of supports are arranged in a triangular lattice shape within a recessed area of the base plate. An interval d of the supports is 20 mm. Each support has a cylindrical shape, and each support has a size of 1 mm in diameter and 500 µm in height.

A laser beam is irradiated on the workpiece using a $CO_2$ laser having an output power of 100 W, for an irradiation time of 165 µsec. A target spot size of the laser beam on an irradiated surface of the workpiece is approximately 69 µm to approximately 71 µm. After completion of the laser beam irradiation, a discharge is generated between a needle-shaped first electrode and the base plate.

Under the above described conditions, a total of 17856 holes are formed at a central part of the glass substrate, that is, a square region having a side of 30 mm. The holes are formed at a pitch of 200 µm.

A number of samples of the glass plates is set to 2. In other words, the holes are formed in the same pattern in 2 glass substrates under the same conditions.

Diameters of openings of the holes (upper openings of the holes) at the first surface of the glass substrate are evaluated. For each glass substrate, 4 holes are evaluated. The 4 holes that are evaluated are selected from a region on each glass substrate corresponding to a minimum triangular unit surrounded by 3 supports that are arranged in the triangular lattice shape. The diameters of the upper openings of a total of 8 selected holes in the 2 glass substrates are averaged, to obtain an average opening diameter $d_{ave}$.

In addition, a process similar to the above are carried out by varying the interval d of the supports of the base plate in a range of 5 mm to 40 mm. Further, the average opening diameter $d_{ave}$ are obtained for each of the cases in which the interval d is varied.

Figure 7:
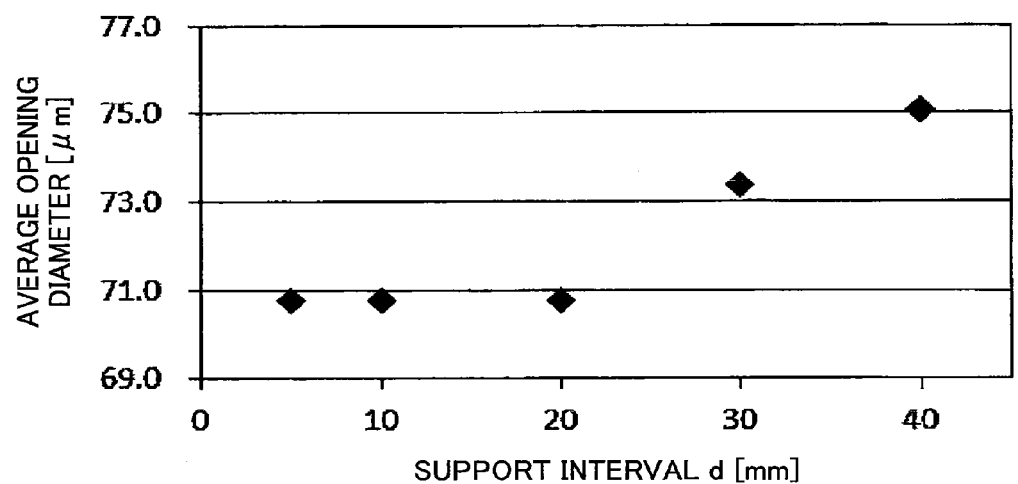
FIG. 7 is a diagram illustrating a relationship between a support interval d of the base plate and an average opening diameter $d_{ave}$ obtained for an experiment 1-1.

FIG. 7 is a diagram illustrating a relationship between the support interval d of the base plate and the average opening diameter $d_{ave}$ obtained for an experiment 1-1.

From the results illustrated in FIG. 7, it is found that the average opening diameter $d_{ave}$ of the holes is 70.8 μm for each of the cases in which the support interval d is varied in the range of 5 mm to 20 mm, and matches well with the target spot size of the laser beam that is approximately 69 μm to approximately 71 μm. On the other hand, the average opening diameter $d_{ave}$ of the holes is 73.4 μm for the case in which the support interval d is 30 mm, and the average opening diameter $d_{ave}$ of the holes is 75.1 μm for the case in which the support interval d is 40 mm, and deviate from the target spot size of the laser beam.

Accordingly, it is confirmed from the above results that the diameter accuracy of the hole can be improved by setting the support interval d to shorter than 30 mm.

(Experiment 1-2)

Evaluation similar to that for the experiment 1-1 is also made in an experiment 1-2. However, unlike the experiment 1-1, the thickness of the glass substrates in the experiment 1-2 is set to 0.2 mm. In addition, the laser beam is irradiated on the workpiece using the $CO_2$ laser having the output power of 100 W, for an irradiation time of 110 μsec. The target spot size of the laser beam on an irradiated surface of the workpiece is approximately 63 μm to approximately 65 μm. Other conditions of the experiment 1-2 are the same as those of the experiment 1-1.

Figure 8:
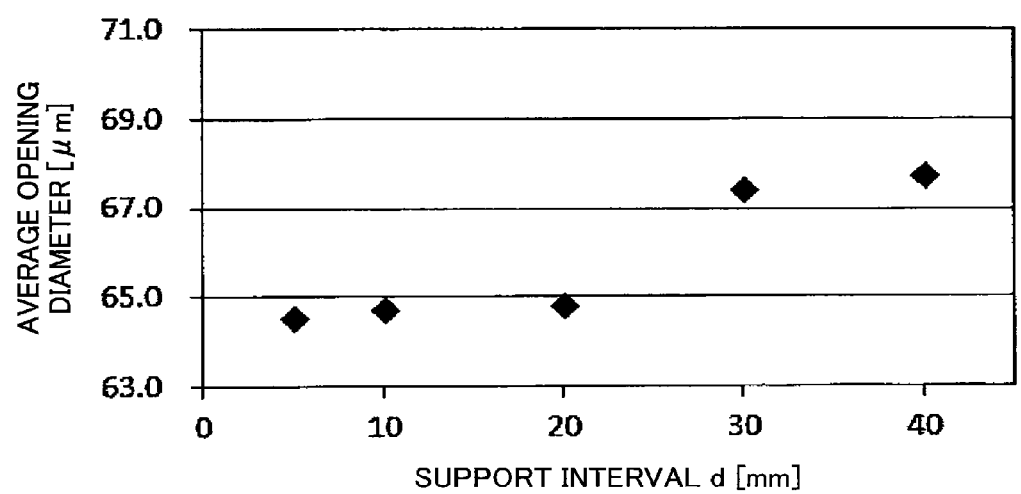
FIG. 8 is a diagram illustrating the relationship between the support interval d of the base plate and the average opening diameter $d_{ave}$ obtained for an experiment 1-2.

FIG. 8 is a diagram illustrating the relationship between the support interval d of the base plate and the average opening diameter $d_{ave}$ obtained for the experiment 1-2.

From the results illustrated in FIG. 8, it is found that the average opening diameter $d_{ave}$ of the holes is in a range of 64.5 μm to 64.8 μm for each of the cases in which the support interval d is varied in the range of 5 mm to 20 mm, and matches well with the target spot size of the laser beam that is approximately 63 μm to approximately 65 μm. On the other hand, the average opening diameter $d_{ave}$ of the holes is 67.4 μm for the case in which the support interval d is 30 mm, and the average opening diameter $d_{ave}$ of the holes is 67.7 pin for the case in which the support interval d is 40 mm, and deviate from the target spot size of the laser beam.

Accordingly, it is confirmed from the above results that the diameter accuracy of the hole can be improved by setting the support interval d to shorter than 30 mm.

(Experiment 1-3)

Evaluation similar to that for the experiment 1-1 is also made in an experiment 1-3. However, unlike the experiment 1-1, the thickness of the glass substrate in the experiment 1-3 is set to 0.5 mm. In addition, the laser beam is irradiated on the workpiece using the laser having the output power of 100 W, for an irradiation time of 410 μsec. The target spot size of the laser beam on an irradiated surface of the workpiece is approximately 89 μm to approximately 91 μm. Other conditions of the experiment 1-3 are the same as those of the experiment 1-1.

Figure 9:
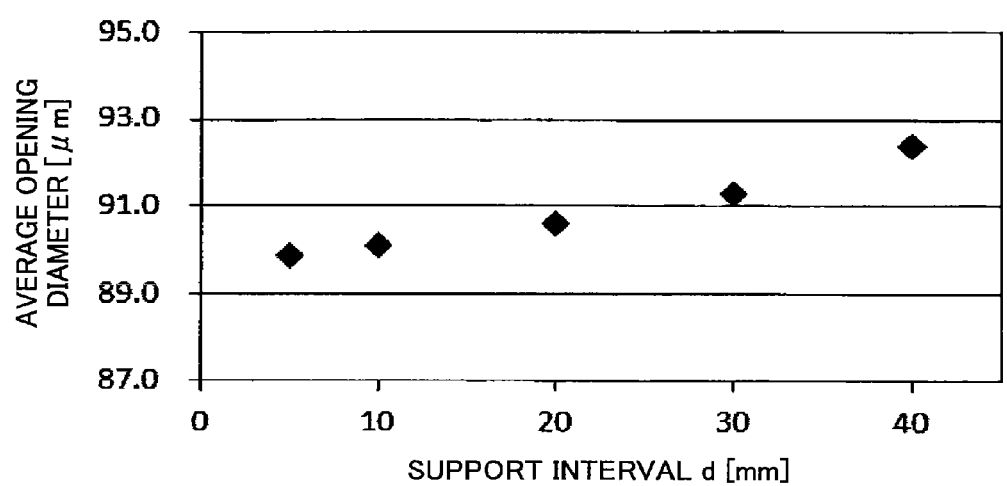
FIG. 9 is a diagram illustrating the relationship between the support interval d of the base plate and the average opening diameter $d_{ave}$ obtained for an experiment 1-3.

FIG. 9 is a diagram illustrating the relationship between the support interval d of the base plate and the average opening diameter $d_{ave}$ obtained for the experiment 1-3.

From the results illustrated in FIG. 9, it is found that the average opening diameter $d_{ave}$ of the holes is in a range of 89.9 μm to 90.6 μm for each of the cases in which the support interval d is varied in the range of 5 mm to 20 mm, and matches well with the target spot size of the laser beam that is approximately 89 μm to approximately 91 μm. On the other hand, the average opening diameter $d_{ave}$ of the holes is 91.3 μm for the case in which the support interval d is 30 mm, and the average opening diameter $d_{ave}$ of the holes is 92.4 μm for the case in which the support interval d is 40 mm, and deviate from the target spot size of the laser beam.

Accordingly, it is confirmed from the above results that the diameter accuracy of the hole can be improved by setting the support interval d to shorter than 30 mm.

The following Table 1 tabulates the opening diameter of the holes obtained by the experiments 1-1, 1-2, and 1-3.

TABLE 1

| EXPERIMENT | THICKNESS OF GLASS PLATE [mm] | SUPPORT INTERVAL d | | | | |
|---|---|---|---|---|---|---|
| | | 5 mm | 10 mm | 20 mm | 30 mm | 40 mm |
| 1-1 | 0.3 | 70.8 μm | 70.8 μm | 70.8 μm | 73.4 μm | 75.1 μm |
| 1-2 | 0.2 | 64.5 μm | 64.7 μm | 64.8 μm | 67.4 μm | 67.7 μm |
| 1-3 | 0.5 | 89.9 μm | 90.1 μm | 90.6 μm | 91.3 μm | 92.4 μm |

(Experiment 1-4)

Evaluation similar to that for the experiment 1-1 is also made in an experiment 1-4. However, the experiment 1-4 uses a base plate in which an arrangement of the supports is different from that of the experiment 1-1.

All of the supports are arranged in the X-axis direction at an interval $d_1$ of 20 mm, and the supports are arranged in the Y-axis direction at an interval $d_2$ of 20 mm. Other than the arrangement of the supports, the conditions of the experiment 1-4 are the same as those of the experiment 1-1.

In a range in which the support interval d (both the intervals $d_1$ and $d_2$) is 5 mm to 20 mm, an average opening diameter $d_{ave}$ of the holes is 70.5 μm, and matches well to a target spot size of the laser beam that is in a range of approximately 69 μm to approximately 71 μm. On the other hand, the average opening diameter $d_{ave}$ of the holes is 73.1 μm for the case in which the support interval d is 30 mm, and the average opening diameter $d_{ave}$ of the holes is 74.8 μm for the case in which the support interval d is 40 mm, and deviate from the target spot size of the laser beam.

Accordingly, it is confirmed from the above results that the diameter accuracy of the hole can be improved by setting the support interval d to shorter than 30 mm.

(Experiment 1-5)

Evaluation similar to that for the experiment 1-2 is also made in an experiment 1-5. However, the experiment 1-5 uses a base plate identical to the base plated used in the experiment 1-4.

In a range in which the support interval d (both the intervals $d_1$ and $d_2$) is 5 mm to 20 mm, an average opening diameter $d_{ave}$ of the holes is in a range of 64.3 µm to 64.7 µm, and matches well to a target spot size of the laser beam that is in a range of approximately 64 µm to approximately 66 µm. On the other hand, the average opening diameter $d_{ave}$ of the holes is 67.3 µm for the case in which the support interval d is 30 mm, and the average opening diameter $d_{ave}$ of the holes is 67.6 µm for the case in which the support interval d is 40 mm, and deviate from the target spot size of the laser beam.

Accordingly, it is confirmed from the above results that the diameter accuracy of the hole can be improved by setting the support interval d to shorter than 30 mm.

(Experiment 1-6)

Evaluation similar to that for the experiment 1-3 is also made in an experiment 1-6. However, the experiment 1-6 uses a base plate identical to the base plated used in the experiment 1-4.

In a range in which the support interval d (both the intervals $d_1$ and $d_2$) is 5 mm to 20 mm, an average opening diameter $d_{ave}$ of the holes is in a range of 89.5 µm to 90.4 µm, and matches well to a target spot size of the laser beam that is in a range of approximately 89 µm to approximately 91 µm. On the other hand, the average opening diameter $d_{ave}$ of the holes is 91.1 µm for the case in which the support interval d is 30 mm, and the average opening diameter $d_{ave}$ of the holes is 92.2 µm for the case in which the support interval d is 40 mm, and deviate from the target spot size of the laser beam.

Accordingly, it is confirmed from the above results that the diameter accuracy of the hole can be improved by setting the support interval d to shorter than 30 mm.

The following Table 2 tabulates the opening diameter of the holes obtained by the experiments 1-4, 1-5, and 1-6.

TABLE 2

| EXPERIMENT | THICKNESS OF GLASS PLATE [mm] | SUPPORT INTERVAL d | | | | |
|---|---|---|---|---|---|---|
| | | 5 mm | 10 mm | 20 mm | 30 mm | 40 mm |
| 1-4 | 0.3 | 70.5 µm | 70.5 µm | 70.5 µm | 73.1 µm | 74.8 µm |
| 1-5 | 0.2 | 64.3 µm | 67.6 µm | 64.7 µm | 67.3 µm | 64.6 µm |
| 1-6 | 0.5 | 89.5 µm | 89.7 µm | 90.4 µm | 91.1 µm | 92.2 µm |

Second Exemplary Implementation

Next, a description will be given of another exemplary implementation of the present invention. In a second exemplary implementation, the second hole forming apparatus 200 illustrated in FIG. 5 described above is used to form a plurality of holes in a glass substrate, and a state of the holes are evaluated.

Non-alkaline glass having dimensions of 50 mm in vertical length, 50 mm in horizontal length, and 0.3 mm in thickness is used as the glass substrate. A first protection film made of PET and having a thickness of 75 µm is formed on a first surface of the glass substrate, and a second protection film made of PET and having a thickness of 75 µm is formed on a second surface of the glass substrate, opposite to the first surface, to form a workpiece.

An aluminum suction type base plate having a square shape (that is, dimensions of approximately 50 mm by approximately 50 mm) is used for a base plate.

In this base plate, a recessed area is defined by inner walls that are formed in a frame shape along an outer peripheral part (that is, the four sides) of the base plate. No support is arranged within the recessed area. In other words, the base plate has a configuration to support a workpiece by a frame-shaped upper surface between the inner walls and the outer peripheral part of the base plate. Dimensions of the recessed area are 25 mm in vertical length by 25 mm in horizontal length. The vertical or horizontal dimension becomes a parameter corresponding to the support interval d of the base plate. In addition, a depth P of the recessed area is 100 µm. This depth P of the recessed area becomes a parameter corresponding to a height h of the support described above.

A laser beam is irradiated on the workpiece using a $CO_2$ laser having an output power of 100 W, for an irradiation time in a range of 168 µsec to 173 µsec. A target spot size of the laser beam on an irradiated surface of the workpiece is set so that a diameter of a second opening of the hole formed in the second surface of the glass substrate becomes 38 µm (that is, a target value). After completion of the laser beam irradiation, a discharge is generated between a needle-shaped first electrode and the base plate.

Under the above described conditions, a single hole is formed at a central part of the glass substrate.

The shape of the opening of the hole (also referred to as "bottom opening of the hole") that is formed, at the second surface of the glass surface, is evaluated.

In addition, a process similar to the above are carried out by varying the depth P of the recessed area, that becomes the parameter corresponding to the height h of the support described above, in a range of 0 µm to 440 µm, to evaluate the shape of the bottom opening of the hole.

As a result of this experiment, it is found that the state of the bottom opening of the hole varies according to the depth P of the recessed area of the base plate. Particularly in a case in which the depth P of the recessed area is 70 µm or less, is found that the shape of the bottom opening of the hole greatly deviates from a complete round shape. On the other hand, in a case in which the depth P of the recessed area is 100 µm or greater, it is found that the shape of the bottom opening of the hole is close to the complete round shape.

In the case in which the depth P of the recessed area is 70 µm or less, it is confirmed that the second protection film of the workpiece is adhered to the recessed area of the base plate after forming the hole. Accordingly, it may be regarded that under the condition in which the depth P of the recessed area is 70 µm or less, the second protection film adheres to the bottom of the base plate immediately under the hole during the forming of the hole, to thereby seal the recessed area. It may be regarded that the thermofusion of the bottom opening of the hole occurs due to the heat accumulated within the sealed recessed area.

It is thus confirmed that the shape of the bottom opening of the hole can be made close to the desired shape (for example, the complete round shape), by setting the depth P of the recessed area, that is, the height h of the support of the base plate, to a value exceeding 70 µm.

Third Exemplary Implementation

In a third exemplary implementation, the second hole forming apparatus 200 illustrated in FIG. 5 described above is used to form a plurality of holes in a glass substrate, and a state of the holes are evaluated.

Non-alkaline glass having dimensions of 50 mm in vertical length, 50 mm in horizontal length, and 0.3 mm in thickness is used as the glass substrate. A first protection film made of PET is formed on a first surface of the glass substrate, and a second protection film made of PET is formed on a second surface of the glass substrate, opposite to the first surface, to form a workpiece. A thickness of the workpiece is 0.4 mm.

An aluminum suction type base plate having a square shape (that is, dimensions of approximately 50 mm by approximately 50 mm) is used for a base plate, and all of supports are arranged in a triangular lattice shape within a recessed area of the base plate. An interval d of the supports is 20 mm. Each support has an approximate cylindrical shape, and each support has a size of 1 mm in diameter.

2 kinds of base plates are used, one having a depth of the recessed area, that is, a height h of the support that is 1010 µm, and other having the height h of 1480 µm.

A laser beam is irradiated on the workpiece using a $CO_2$ laser having an output power of 100 W, for an irradiation time in a range of 168 µsec to 173 µsec. A target spot size of the laser beam on an irradiated surface of the workpiece is set so that a diameter of a second opening of the hole formed in the second surface of the glass substrate becomes 38 µm (that is, a target value). After completion of the laser beam irradiation, a discharge is generated between a needle-shaped first electrode and the base plate.

A distance a from a tip end of a first electrode to the focal point of the laser beam irradiated on the irradiating surface of the workpiece at the time of generating the discharge is approximately 1200 µm. Accordingly, a distance D represented by D=a+T+h is 2610 µm for the case in which the height h of the support is 1010 µm, and is 3080 µm for the case in which the height h of the support is 1480 µm.

Under the above described conditions, a plurality of holes are formed in the glass substrate.

As a result of experiments, it is found that the discharge is stably generated at the time of the machining in the case in which the height h of the support of the base plate is 1010 µm (that is, the distance D=2610 µm). On the other hand, it is found that the discharge may occur at a non-intended location, or the discharge may not occur, and it is difficult to generate a stable discharge phenomenon in the case in which the height h of the support of the base plate is 1480 µm (that is, the distance D=3080 µm).

From the results described above, it is found that the distance D represented by D=a+T+h is preferably 3000 µm or less, and more preferably 2610 µm or less.

The embodiments and exemplary implementations described above can provide an apparatus and a method capable of accurately forming holes having desired diameters and opening shapes.

Although the exemplary implementations are numbered with, for example, "first," "second," or "third," the ordinal numbers do not imply priorities of the exemplary implementations. Many other variations and modifications will be apparent to those skilled in the art.

What is claimed is:

1. An apparatus for forming holes in a glass substrate, comprising:
   a laser source that irradiates a laser beam on a first surface of the glass substrate; and
   a base plate on which a second surface of the glass substrate, opposite to the first surface, is placed,
   wherein the base plate includes a recessed area in a central part thereof, and a plurality of supports arranged within the recessed area to support the glass substrate,
   wherein at least a part of the plurality of supports is arranged in a lattice shape within a plane approximately perpendicular to a direction in which the plurality of supports extend,
   wherein one support and another adjacent support closest to the one support, amongst the supports arranged in the lattice shape, are arranged at an interval d that is shorter than 30 mm, and
   wherein the plurality of supports have a height h that is higher than 70 µm.

2. The apparatus as claimed in claim 1, wherein the lattice shape is a triangular lattice shape.

3. The apparatus as claimed in claim 2, wherein all of the plurality of supports are arranged in the triangular lattice shape within the plane approximately perpendicular to the direction in which the plurality of supports extend.

4. The apparatus as claimed in claim 1, wherein the lattice shape is a rectangular lattice shape.

5. The apparatus as claimed in claim 4, wherein all of the plurality of supports are arranged in the rectangular lattice shape within the plane approximately perpendicular to the direction in which the plurality of supports extend.

6. The apparatus as claimed in claim 1, wherein the interval d is longer than 10 mm.

7. The apparatus as claimed in claim 1, wherein the base plate includes a suction mechanism that fixes the glass substrate thereon by suction.

8. The apparatus as claimed in claim 1, wherein the recessed area of the base plate is defined by an inner wall that is formed at an outer peripheral part of the base plate.

9. The apparatus as claimed in claim 1, wherein the plurality of supports have a maximum dimension in a range of 500 µm to 5000 µm.

10. The apparatus as claimed in claim 1, wherein the glass substrate has a thickness in a range of 0.05 mm to 0.7 mm.

11. The apparatus as claimed in claim 1, wherein the glass substrate includes a first protection film formed on the first surface, and a second protection film formed on the second surface.

12. A method for forming holes in a glass substrate, comprising:
    preparing a workpiece that includes a glass substrate having a first surface and a second surface opposite to the first surface; and
    irradiating a laser beam on the first surface of the glass substrate, to form the holes in the glass substrate,
    wherein the irradiating is performed in a state in which the workpiece is placed on a base plate such that the second surface of the glass substrate is closer to the base plate,
    wherein the base plate includes a recessed area in a central part thereof, and a plurality of supports within the recessed area to support the workpiece,
    wherein at least a part of the plurality of supports is arranged in a lattice shape within a plane approximately perpendicular to a direction in which the plurality of supports extend,
    wherein one support and another adjacent support closest to the one support, amongst the supports arranged in the lattice shape, are arranged at an interval d that is shorter than 30 mm, and
    wherein the plurality of supports have a height h that is higher than 70 µm.

13. The method as claimed in claim 12, wherein the lattice shape is a triangular lattice shape.

14. The method as claimed in claim 13, wherein all of the plurality of supports are arranged in the triangular lattice shape within the plane approximately perpendicular to the direction in which the plurality of supports extend.

15. The method as claimed in claim 12, wherein the lattice shape is a rectangular lattice shape.

16. The method as claimed in claim 15, wherein all of the plurality of supports are arranged in the rectangular lattice shape within the plane approximately perpendicular to the direction in which the plurality of supports extend.

17. The method as claimed in claim 12, wherein the preparing forms a first protection film on the first surface of the glass substrate, and forms a second protection film on the second surface of the glass substrate.

* * * * *